US010783501B1

(12) United States Patent
Ramanathan et al.

(10) Patent No.: US 10,783,501 B1
(45) Date of Patent: Sep. 22, 2020

(54) DIGITAL CURRENCY CASH GRID

(71) Applicant: Wells Fargo Bank, N.A., San Francisco, CA (US)

(72) Inventors: Ramanathan Ramanathan, Bellevue, WA (US); Suresh Reddy, Hyderabad (IN); Rameshchandra Bhaskar Ketharaju, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 446 days.

(21) Appl. No.: 15/492,116

(22) Filed: Apr. 20, 2017

(51) Int. Cl.
  G06Q 40/00 (2012.01)
  G06Q 20/06 (2012.01)
  G06Q 20/10 (2012.01)
(52) U.S. Cl.
  CPC ..... G06Q 20/0655 (2013.01); G06Q 20/1085 (2013.01)
(58) Field of Classification Search
  CPC ......... G07D 7/00; G06Q 20/042; G06K 9/033
  See application file for complete search history.

(56) References Cited

U.S. PATENT DOCUMENTS

| 8,742,934 | B1* | 6/2014 | Sarpy, Sr. | ............... | G06Q 50/26 340/573.1 |
| 2007/0125839 | A1* | 6/2007 | Royce-Winston | ... | G06Q 20/381 235/379 |
| 2008/0219543 | A1* | 9/2008 | Csulits | .................. | G06K 9/033 382/135 |
| 2015/0081566 | A1* | 3/2015 | Slepinin | ............ | G06Q 20/3829 705/69 |
| 2015/0170112 | A1* | 6/2015 | DeCastro | ............. | G06Q 20/381 705/39 |
| 2016/0358135 | A1* | 12/2016 | Liao | ....................... | G06Q 20/10 |

OTHER PUBLICATIONS

Macindoe, Frank (E-Cash—Making Money From Websites, https://www.tved.net.au/index.cfm?SimpleDisplay=PaperDisplay.cfm&PaperDisplay=https://www.tved.net.au/PublicPapers/February_1998,_Lawyers_Education_Channel,_E_Cash_Making_Money_From_Websites.html, Feb. 1998) (Year: 1998).*

* cited by examiner

Primary Examiner — Sarah M Monfeldt
Assistant Examiner — Mark H Gaw
(74) Attorney, Agent, or Firm — Walter Haverfield LLP; James J. Pingor

(57) ABSTRACT

Cash grid techniques or systems are disclosed that provide a centralized tracking service for physical and digital currency. In operation, physical digital currency can be associated with, and otherwise tracked between, a mobile wallet and to the cash grid using unique ledger and communication systems and methodologies. A trusted bank or other entity can provide a machine which can convert physical cash to virtual cash. As part of the conversion from physical to digital currency, the identification (ID) (e.g., serial number) of the physical cash is transferred to and linked to the virtual (or digital) cash.

13 Claims, 17 Drawing Sheets

| Cash Grid S.N | Bank ID | SSN-ID | Account Number | Deposit Date | Denomination | Serial Number | Bank Tran ID | Transaction Description | Tran Type | Parent S.N | Is Latest | Is Physical Cash |
|---|---|---|---|---|---|---|---|---|---|---|---|---|
| 330 | 1 | WELLSBR345 | 000345 | 1-Jan-15 | 100 | KB426798601 | 90899304 | Cash debit at store #345 | D | Null | Y | Y |
| 331 | 1 | WELLSBR345 | 000345 | 1-Jan-15 | 100 | KB426793431 | 90899304 | Cash debit at store #345 | D | Null | Y | Y |
| 332 | 1 | WELLSBR345 | 000345 | 1-Jan-15 | 50 | KB426890431 | 90899304 | Cash debit at store #345 | D | Null | Y | Y |
| 334 | 1 | 12341231234 | 9001234900123 | 1-Jan-15 | 100 | KB426798601 | 90899304 | Cash withdraw at store #345 | C | 330 | Y | Y |
| 335 | 1 | 12341231234 | 9001234900123 | 1-Jan-15 | 100 | KB426793431 | 90899304 | Cash withdraw at store #345 | C | 331 | Y | Y |
| 336 | 1 | 12341231234 | 9001234900123 | 1-Jan-15 | 50 | KB426890431 | 90899304 | Cash withdraw at store #345 | C | 332 | Y | Y |

FIG. 10

| Cash Grid S/N | Bank ID | SSN/ID | Account Number | Deposit Date | Denomination | Serial Number | Bank Tran ID | Transaction Description | Tran Type | Parent S/N | Is Latest | Is Physical Cash |
|---|---|---|---|---|---|---|---|---|---|---|---|---|
| 334 | 1 | 12341231234 | 9001234900123 | 1-Jan-15 | 100 | KB42679860I | 90899304 | Cash deposit at store #234 | C | Null | Y | N |
| 335 | 1 | 12341231234 | 9001234900123 | 1-Jan-15 | 100 | KB42679343I | 90899304 | Cash deposit at store #234 | C | Null | Y | N |
| 336 | 1 | 12341231234 | 9001234900123 | 1-Jan-15 | 50 | KB42689043I | 90899304 | Cash deposit at store #234 | C | Null | Y | N |

FIG. 11

| Cash Grid S/N | Bank ID | SSN/ID | Account Number | Deposit Date | Denomination | Serial Number | Bank Tran ID | Transaction Description | Tran Type | Parent S/N | Is Latest | Is Physical Cash |
|---|---|---|---|---|---|---|---|---|---|---|---|---|
| 334 | 1 | 1231231234 | 9001234900123 | 1-Jan-15 | 100 | KB426798601 | 90899304 | Cash deposit at store #234 | D | Null | N | N |
| 335 | 1 | 1231231234 | 9001234900123 | 1-Jan-15 | 100 | KB426793431 | 90899304 | Cash deposit at store #234 | C | Null | Y | N |
| 336 | 1 | 1231231234 | 9001234900123 | 1-Jan-15 | 50 | KB426890431 | 90899304 | Cash deposit at store #234 | C | Null | Y | N |
| 1027 | 1 | 8993239090 | 8900334403443 | 5-Jan-15 | 100 | KB426798601 | 33443343 | Payment old navy store #234 | C | 334 | Y | N |

FIG. 12

| Cash Grid S/N | Bank ID | SSN/ID | Account Number | Deposit Date | Denomination | Serial Number | Bank Tran ID | Transaction Description | Tran Type | Parent S/N | Is Latest | Is Physical Cash |
|---|---|---|---|---|---|---|---|---|---|---|---|---|
| 334 | 1 | 12341231234 | 9001234900123 | 1-Jan-15 | 100 | KB42679860J | 90899304 | Cash deposit at store #234 | C | Null | Y | N |
| 335 | 1 | 12341231234 | 9001234900123 | 1-Jan-15 | 100 | KB42679343I | 90899304 | Cash deposit at store #234 | C | Null | Y | N |
| 336 | 1 | 12341231234 | 9001234900123 | 1-Jan-15 | 50 | KB42689043I | 90899304 | Cash deposit at store #234 | C | Null | Y | N |

FIG. 13

| Cash Grid S/N | Bank ID | SSN/ID | Account Number | Deposit Date | Denomination | Serial Number | Bank Tran ID | Transaction Description | Tran Type | Parent S/N | Is Latest | Is Physical Cash |
|---|---|---|---|---|---|---|---|---|---|---|---|---|
| 334 | 1 | 12341231234 | 9001234900123 | 1-Jan-15 | 100 | KB42679860I | 90899304 | Cash deposit at store #234 | C | Null | Y | N |
| 335 | 1 | 12341231234 | 9001234900123 | 1-Jan-15 | 100 | KB42679343I | 90899304 | Cash deposit at store #234 | C | Null | Y | N |
| 336 | 1 | 12341231234 | 9001234900123 | 1-Jan-15 | 50 | KB42689043I | 90899304 | Cash deposit at store #234 | D | Null | N | N |
| 1200 | 1 | 12341231234 | 9001234900123 | 8-Jan-15 | 25 | KB42689043I-1 | 90899435 | Internal denominations split | C | 336 | Y | N |
| 1201 | 1 | 12341231234 | 9001234900123 | 8-Jan-15 | 25 | KB42689043I-2 | 90899435 | Internal denominations split | C | 336 | Y | N |

FIG. 14

| Cash Grid S/N | Bank ID | SSN/ID | Account Number | Deposit Date | Denomination | Serial Number | Bank Tran ID | Transaction Description | Tran Type | Parent S/N | Is Latest | Is Physical Cash |
|---|---|---|---|---|---|---|---|---|---|---|---|---|
| 334 | 1 | 12341231234 | 9001234900123 | 1-Jan-15 | 100 | KB42679860I | 90899304 | Cash deposit at store #234 | D | Null | N | N |
| 335 | 1 | 12341231234 | 9001234900123 | 1-Jan-15 | 100 | KB4267934BI | 90899304 | Cash deposit at store #234 | C | Null | Y | N |
| 336 | 1 | 12341231234 | 9001234900123 | 1-Jan-15 | 50 | KB426890431 | 90899304 | Cash deposit at store #234 | D | Null | N | N |
| 1200 | 1 | 12341231234 | 9001234900123 | 8-Jan-15 | 25 | KB426890431-1 | 90899435 | Internal denominations split | D | 336 | N | N |
| 1201 | 1 | 12341231234 | 9001234900123 | 8-Jan-15 | 25 | KB426890431-2 | 90899435 | Internal denominations split | C | 336 | Y | N |
| 1202 | 1 | 8993239090 | 8900334403443 | 8-Jan-15 | 100 | KB42679860I | 33443343 | To Sam | C | 334 | Y | N |
| 1203 | 1 | 8993239090 | 8900334403443 | 8-Jan-15 | 25 | KB426890431-1 | 33443343 | To Sam | C | 1200 | Y | N |

FIG. 15

DIGITAL CURRENCY CASH GRID

BACKGROUND

Currently, a majority of the currency in the global financial system is digital and not held in physical form. This digital currency is increasingly being accounted for and traded on the Internet. As with many digital assets, without comprehensive tracking and fraud detection safeguards in place, they are vulnerable to misappropriation, fraud and the like.

In accordance with present trading scenarios, with currency changing hands numerous times in a day, the problem of the movement and transfer of readily available cash/currency in a safe manner is gradually assuming the form of a huge logistical problem. Thus, safe tracking and protection of currency will become paramount as the shift from physical to digital currency continues.

Further, with the digital age of currency on the rise, more opportunities exist for wrongdoers, for example, with 'black money.' 'Black money' refers to funds earned illegally on the black market, on which income and other taxes have not been paid. Similarly, much of the 'black money' was generated as proceeds of criminal activity such as extortion, drug sales, bribery, prostitution and forms of corruption. While the total amount of 'black money' deposited into foreign banks and financial institutions is unknown, some reports claim an excess of $1 trillion U.S. dollars being held in offshore banks in Switzerland.

Countries have continually attempted to combat 'black money' and other fraudulent schemes by, for example, issuing new, redesigned currency. Unfortunately, these attempts do not accomplish diminishing the amount of physical currency or the ability to track ownership of particular currency. Therefore, the ability for fraud, laundering, etc. continues to exist with the physical currency.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of cash grid techniques or systems are provided herein. Generally, aspects of the subject innovation suggest digital currency can be connected to, and otherwise tracked between, a mobile wallet and to the cash grid. A trusted bank or other entity can provide a machine and the machine then converts physical cash to virtual cash. As part of the conversion from physical to digital currency, the identification (ID) (e.g., serial number) of the physical cash is transferred to and linked to the virtual (or digital) cash. In order to efficiently and effectively monitor the currency, the cash grid can maintain a digital wallet and journal of changes to the digital cash. As will be understood, monitoring the virtual (and physical) currency can assist with combating and mitigation of money laundering and prevention of other fraudulent activities.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

FIG. 10 illustrates an example ledger log in accordance with aspects of the innovation.

FIG. 11 illustrates an example ledger log in accordance with aspects of the innovation.

FIG. 12 illustrates an example ledger log in accordance with aspects of the innovation.

FIG. 13 illustrates an example ledger log in accordance with aspects of the innovation.

FIG. 14 illustrates an example ledger log in accordance with aspects of the innovation.

FIG. 15 illustrates an example ledger log in accordance with aspects of the innovation.

DETAILED DESCRIPTION

Figure 1:
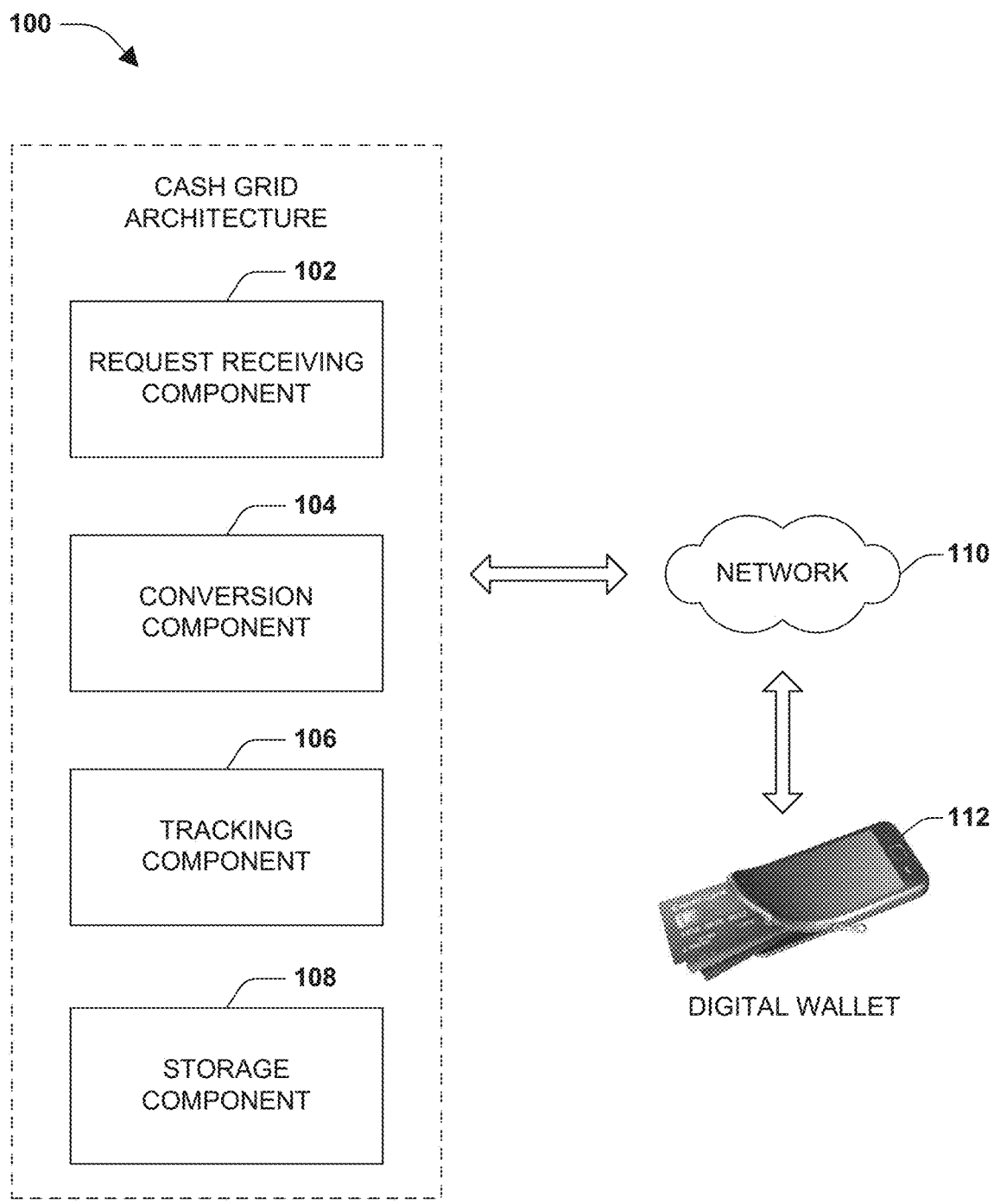
FIG. 1 illustrates an example cash grid system architecture in accordance with aspects of the innovation.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

As will be understood and appreciated upon a review of this specification, the innovation's features, function and benefits provide systems and processes that can combat, mitigate and potentially eliminate money laundering. Further, other fraudulent activities related currency (physical and/or digital) can be alleviated via the innovation's tracking and prevention mechanisms. In doing so, it is possible to identify and conceivably prevent 'black money.'

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For instance, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

With reference now to the drawings, FIG. 1 illustrates an example cash grid architecture 100 in accordance with aspects of the innovation. In particular, the example architecture 100 includes a request receiving component 102, a conversion component 104, a tracking component 106 and a storage component 108 capable of communicating via a network 110 to a digital wallet 112. While specific locations of components and subcomponents are illustrated in FIG. 1 (as well as the figures that follow), it is to be understood that components can be co-located or located in alternative locations without departing from the spirit and/or scope of the innovation. For example, in one alternative embodiment, all or a subset of the cash grid architecture 100 can be embedded or otherwise resident upon the digital wallet 112 (e.g., within a smartphone or other mobile device.) This and other contemplated embodiments are to be included within the scope of this disclosure and claims appended hereto.

In operation, the cash grid architecture system 100 enables physical currency notes (e.g., bills and coins) to be digitized and effectively managed via a grid-like system. The grid-like system can be accessible by most any authorized entity (e.g., public, private, governmental, etc.). Similarly, the grid enables owners and entities to record and track the ownership along with the transfer of ownership as appropriate. Over time, all or most all recorded currency (physical as well as digital), will be able to be inventoried and accounted for as/if appropriate. As is to be understood, physical currency can be input into the system in a number of ways without departing from the spirit and/or scope of the innovation. For example, physical currency can be input in-person or institution via device. Similarly, digital currency can be maintained in alternate locations including, but not limited to, digital wallets, cloud-based storage, financial institution devices or the like.

Essentially, the innovation can be viewed from at least a couple differing perspectives. First, the innovation can be viewed as a bridging or phasing of the transition between physical and digital currency. In other words, the innovation can facilitate identification, recordation, digitizing and destruction (or otherwise marking, e.g., 'invalid') of physical currency. These actions assist in the seemingly inevitable transition between physical and digital currency. Secondly, the innovations features, functions and benefits facilitate recordation of physical and digital currency so as to account for ownership, account for amounts in circulation, mitigate money laundering as well as 'black money,' etc. These and other benefits of the innovation will become apparent upon a review of the disclosure infra.

With reference again to FIG. 1, the request receiving component 102 can receive a request from a customer or entity (e.g., financial institution) to digitize, record or transfer ownership of currency. As used herein, 'currency' and 'currency note' can refer to physical currency (e.g., bills, notes, coins or the like) as well as digital currency. Continuing with an example of a request to convert physical currency to digital currency, the request receiving component 102 can receive the request and thereby interact with the conversion component 104 which effects the conversion. Discussions of the specific functionality of the request receiving component 102 and the conversion component 104 are included infra, e.g., with reference to FIG. 3 and FIG. 4 respectively that follow.

The tracking component 106 can tag or otherwise ledger the currency. As will be understood, the ledger is a chronology of the activity related to a particular sum of currency. Here, the sum or currency can be most any denomination. Upon tracking a conventional bill, the serial number of the paper bill is captured (e.g., via a scanner or image capture device) and associated with a digital counterpart (or object). Thus, the digital counterpart will replace the physical currency whereas, in aspects, the physical (e.g., paper) currency is marked with a desired indicia such as 'invalid,' 'void,' etc., and/or otherwise physically reconfigured (e.g., shredded, imprinted, stamped, etc.). In the instance of coins or other currency that do not have a unique serial number, a serial can be generated and assigned to each coin or group/batch of coins as appropriate. These coins can then be tracked via the ledger as it relates to the serial number(s) or other unique identifier.

This ledger information can be stored in the storage component 108. The storage component 108 can be a local store, cloud-based store, distributed store, mirrored store or the like, or combinations thereof.

In aspects, the serial number of the now digital funds (currency) can be used as a means of fraud detection. Here, upon receiving a subsequent request, the serial number of the paper currency can be cross referenced via the storage component(s) 108 in order to identify if the currency at issue has previously been converted and/or otherwise destroyed. Additionally, the cross-reference or analysis can establish if the requestor/holder is the owner of record of a particular currency.

Once converted, the funds can be accessed from the grid 100 via a network 110, for instance, using a digital wallet 112. As will be understood and appreciated, the network can be most any network including but, not limited to the internet, a local access network (LAN), a wide area network (WAN), mobile or cell network or the like. Similarly, the digital wallet 112 can be most any electronic device capable of effecting transfer of digital funds, including but not limited to, a smartphone, smartwatch, tablet, digital card or other capable electronic or computing device.

In summary, the acts of recordation and tracking of ownership of currency notes can be as follows. In operation, when currency notes are issued to customers at bank or ATM (e.g., in response to a request received via a request receiving component 102), a record is maintained between the serial number of the note and the customer (e.g., via the tracking component 106). This recordation will help identify the current owner of the currency note as well as to verify that the note at issue is indeed valid currency.

As will be explained in greater detail infra, whenever the customer deposits the cash at bank, the same note is assigned (e.g., recorded, tagged) to the bank. When the same note (physical or digital) is issued to another customer, it will be recorded against the new customer, e.g., in a ledger. By individually tracking currency, there can be a complete record of how the currency note is circulated. This information can be pushed to a centralized server (or network of servers) called a cash grid. Multiple entities subscribe to cash grid for various needs.

As described supra and in more detail infra, currency notes can be digitized or otherwise associated to a digital form object that represents the physical (paper or metal) currency. In operation, this process involves converting physical currency notes to digital form as well as invalidating (e.g., marking, destroying, punching, etc.) the physical notes. Once the physical cash is invalidated, the physical notes will be sent to central bank and those notes are considered invalid for circulation. The converted digital cash or currency is recorded in a cash grid's ledger and stored in an appropriate store. As illustrated in FIG. 1, the digital money can be associated with and spent in digital form via a digital wallet or other desired electronic method.

For ongoing tracking, as transactions occur related to the digital cash, each transaction gets recorded in the cash grid. Examples of such ledger entries are included below for reference. It is to be understood that these ledger entries are not intended to limit the innovation in any manner. Rather, the specific entries are included merely to provide context to the innovation for ease of understanding. Thus, other ledger entries exist and are to be included within the spirit and/or scope of the innovation and claims appended hereto.

Figure 2:
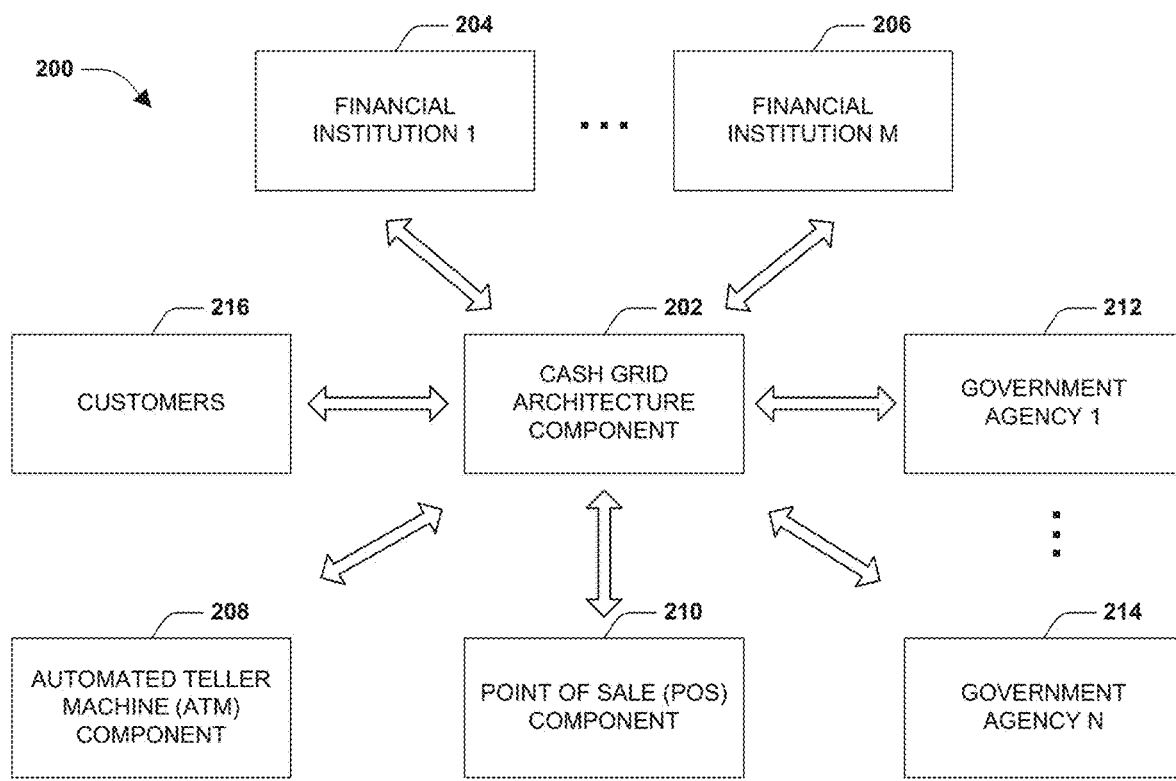
FIG. 2 illustrates an example cash grid environment in accordance with aspects of the innovation.

Referring now to FIG. 2, a system 200 in accordance with aspects of the innovation is shown. As shown, a cash grid architecture component 202 can interact with and be interacted by a multitude of entities. As described with reference to FIG. 1, it is to be appreciated that some of the components illustrated in FIG. 1 can be located, co-located or remote to the system (e.g., located in connection with a particular entity(ies)).

As shown various banks and financial institutions (204, 206, where M is an integer) can connect to cash grid 202. In examples, the financial institutions (204, 206) can access the cash grid 202 to perform deposit/withdraw transactions, inquire regarding financial transaction and currency or the like.

Automated teller machines (ATMs) 208, Point of Sale (POS) terminals 210 or the like can get connected to the cash grid to assist in digitizing as well as marking or otherwise destroying physical cash. Additionally, these nodes to the cash grid 202 are capable of recording and tracking information as related to physical and digital cash or currency.

Government and other regulatory agencies (212, 214, where N is an integer) are in contact with the cash grid architecture 202. As illustrated on FIG. 2 by the bi-directional arrows, it is to be understood that information can flow between the entities illustrated and the cash grid architecture 202. In one example, FINRA (Financial Industry Regulatory Authority) is capable of utilizing information from the grid to mitigate or otherwise identify money laundering activities. Here, the ledger, tracking and association of physical and digital cash can assist this agency in identifying unlawful behavior related to financial resources.

The Federal Bureau of Investigations (FBI) and other investigative entities can similarly utilize the cash grid architecture 202 and particularly, ledger information to assist in criminal investigations, for example, fraud and money laundering. Of course, these entities will need to have clearance and other legal authority to access information from the cash grid.

The Federal Reserve System (FED) can likewise access the grid in order to manage, query, access or otherwise track physical and digital cash or currency. It will be appreciated that the FED will likely have the most instrumental role in managing the assets stored via the cash grid architecture component 202. In addition to managing, querying, accessing and tracking currency via the grid, the FED, as the central bank of the United States, will also have comprehensive access to accounting of circulation amounts, research and the like such that control of the monetary system(s) can be effectively gained.

Finally, customers 216 can access the grid 202 for a number of reasons. For instance, customers can verify the authenticity of physical currency notes. As well, customers 216 will be able to retrieve a centralized accounting of their financial assets in a single location (i.e., the cash grid 202). In other words, for example, a customer will be able to query (e.g., via mobile device, ATM, etc.) a number of financial institutions (e.g., 204, 206) to as to obtain an aggregated accounting of their account balances, activity information or the like. The benefit(s) of such a centralized cash grid architecture will be appreciated upon a review of this specification.

Overall, the innovation provides the infrastructure that establishes a system to record ownership of currently circulated physical currency notes. As well, a physical device can be provided that is able to accept cash deposits, convert physical to digital currency along with appropriate tracking mechanisms. Additionally, this physical device(s) will be able to mark or otherwise destroy out-of-circulation physical currency. Further, the device(s) will be able to identify the counterfeit notes easily and efficiently.

ATMs, stores and merchant POS terminals can be equipped with compatible devices to effect the transition and subsequent tracking of physical currency. In accordance with aspects of the innovation, the 'cash grid' will be able to store the customer account information and the serial numbers of currency notes they own in most any number of entities connected to the grid. Similarly, in aspects customers will be issued a secure digital wallet that will assist and enable transactions with digital money. Of course, the customer's device (e.g., mobile device, smartphone, smartwatch, etc.) will have connectivity to cash grid. Appropriate security measures will be implemented to mitigate, alleviate or eliminate fraudsters or other unauthorized access to customer's data or digital currency. These security measures can include, but are not limited to, biometric authentication, tokens, keys, encryption/decryption, PINs (personal identification numbers), device identifications, or the like.

Figure 3:
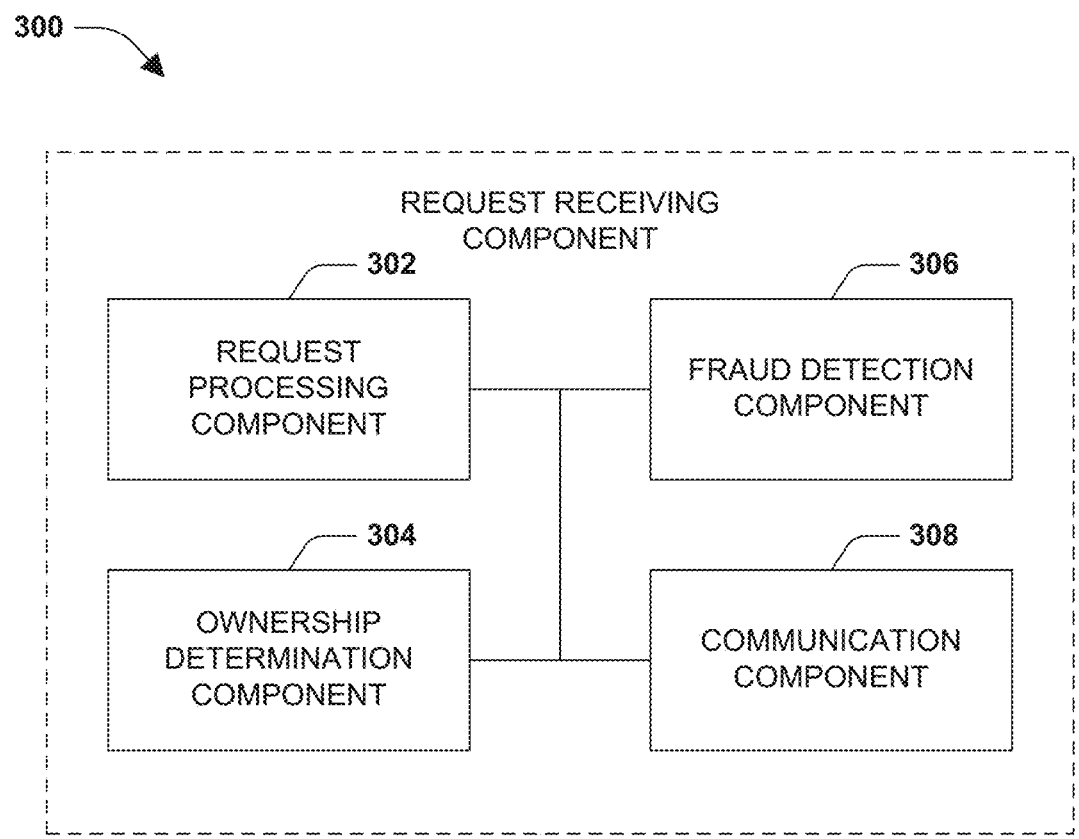
FIG. 3 illustrates an example request receiving component in accordance with aspects of the innovation.

FIG. 3 illustrates an example request receiving component 300 in accordance with aspects of the innovation. As shown, the example request receiving component 300 can include a request processing component 302, an ownership determination component 304, a fraud detection component 306 and a communication component 308. Essentially, the components illustrated in FIGS. 3-5, or a subset thereof, can be resident upon or within a kiosk, an ATM, a mobile computing device, or most any other computing device. Similarly, it is to be understood and appreciated that components and sub-components can be located or otherwise located without departing from the spirit and/or scope of the innovation. For example, a fraud detection component can be resident within the tracking component in alternative aspects.

In operation, a request, e.g., withdrawal request, can be administered via the request processing component 302. Here, a transaction request (e.g., withdrawal, conversion, balance, etc.) can be managed via the component 302. In response, the request processing component 302 can interact with the ownership determination component 304 and/or the fraud detection component 308 in handling the request. As will be understood upon a review of the example use cases infra, these components (as well as other subcomponents) can be employed to facilitate process of requests related to conversion of funds (e.g., physical to digital), tracking/tagging as well as administration of funds.

The communication component 308 can be employed to enable communications between a user or entity and the cash grid. For example, the communication component 308 can employ most any protocol, e.g., Wi-Fi based upon IEEE 802.11 standards, etc., to facilitate interaction with nodes connected to the grid as well as to the data store(s).

Figure 4:
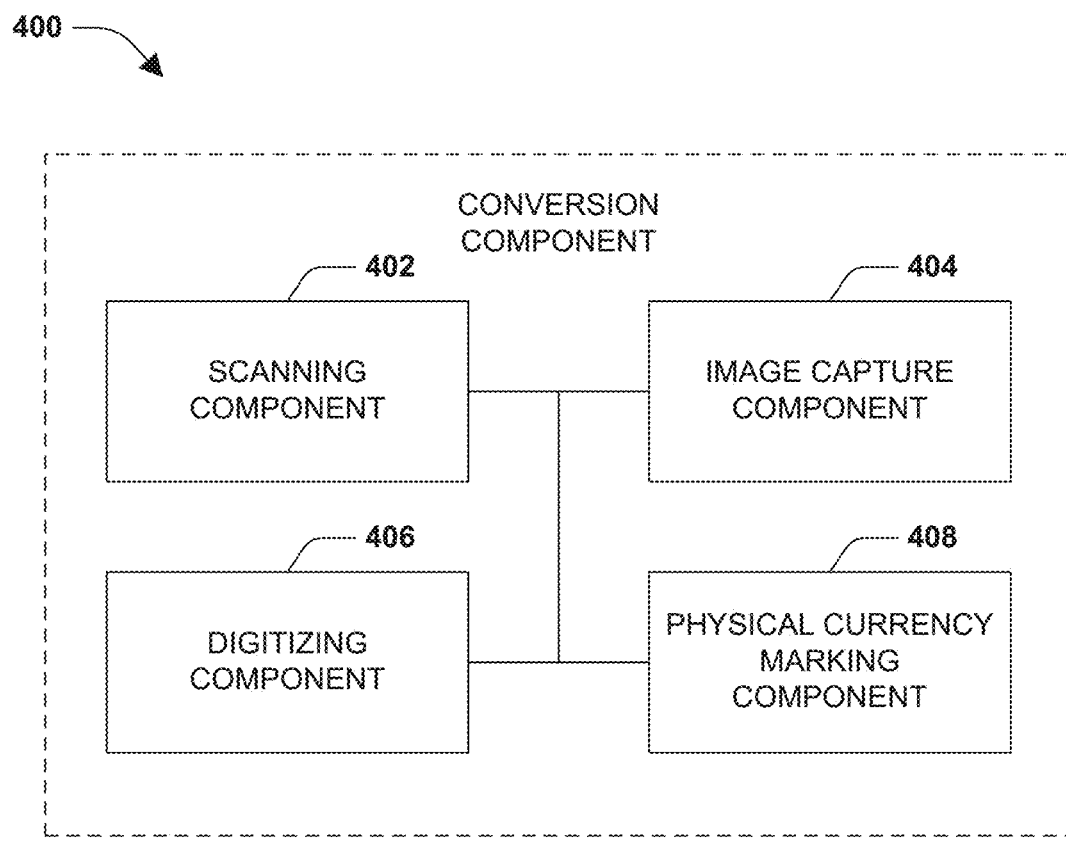
FIG. 4 illustrates an example conversion component in accordance with aspects of the innovation.

FIG. 4 illustrates and example conversion component 400 in accordance with aspects of the innovation. As shown, the conversion component 400 can include a scanning component 402, an image capture component 404, a digitizing component 406 and/or a physical currency marking component 408. In action, the conversion component 400 communicates with the request receiving component (e.g., 300 of FIG. 3) to commence an action.

In one example, an action can be related to conversion of physical to digital currency. In one aspect, a scanning component 402 or other image capture component 404 (e.g., camera) can be employed to capture visual data related to the physical currency. The digitizing component 406 can analyze the visual data to establish authenticity, denomination, serial number or other unique identifiers, etc. As will be understood, the digitizer can work in combination with the currency tracking component of FIG. 5 to establish authenticity, ownership or the like.

Upon completion of the analysis of the visual data, the digitizing component 406 can generate a unique digital currency object that corresponds to the original physical currency. Thereafter, the physical currency marking component 408 can physically mark the now 'out-of-circulation' bills or coins. In other aspects, or in addition to, the physical currency marking component 408 can destroy or otherwise physically alter (e.g., imprint, stamp, punch) the physical currency so as to mitigate or eliminate any ability for the currency to reenter circulation.

Figure 5:
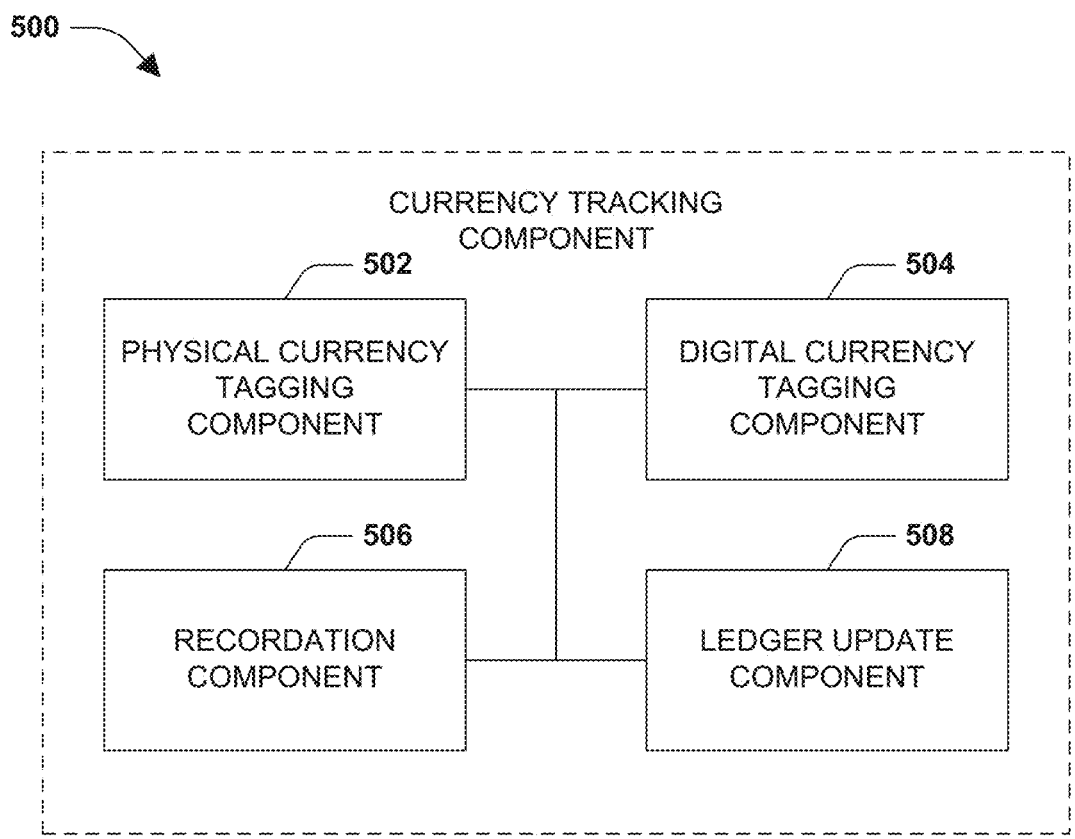
FIG. 5 illustrates an example currency tracking component in accordance with aspects of the innovation.

FIG. 5 illustrates an example currency tracking component 500 in accordance with aspects of the innovation. In this aspect, the physical currency tagging component 502 and the digital currency tagging component 504 can be employed to electronically tag and therefore record information associated with the respective currency. This tagging and recordation will be better understood upon a review of the ledger information that follows. In essence, once the electronic tag information is generated, the recordation component 506 stores the information while the ledger update component 508 generates (or updates) the appropriate ledger information.

As will be understood upon a review of the example use cases that follow, the ledger can be employed to track the ownership as well as the authenticity of the currency in real- (or near real-) time. Once a denomination of currency is transferred, deposited, withdrawn, taken out of circulation, etc. the ledger on the cash grid is dynamically updated thereby maintaining a record in real- or near real-time.

Figure 6:
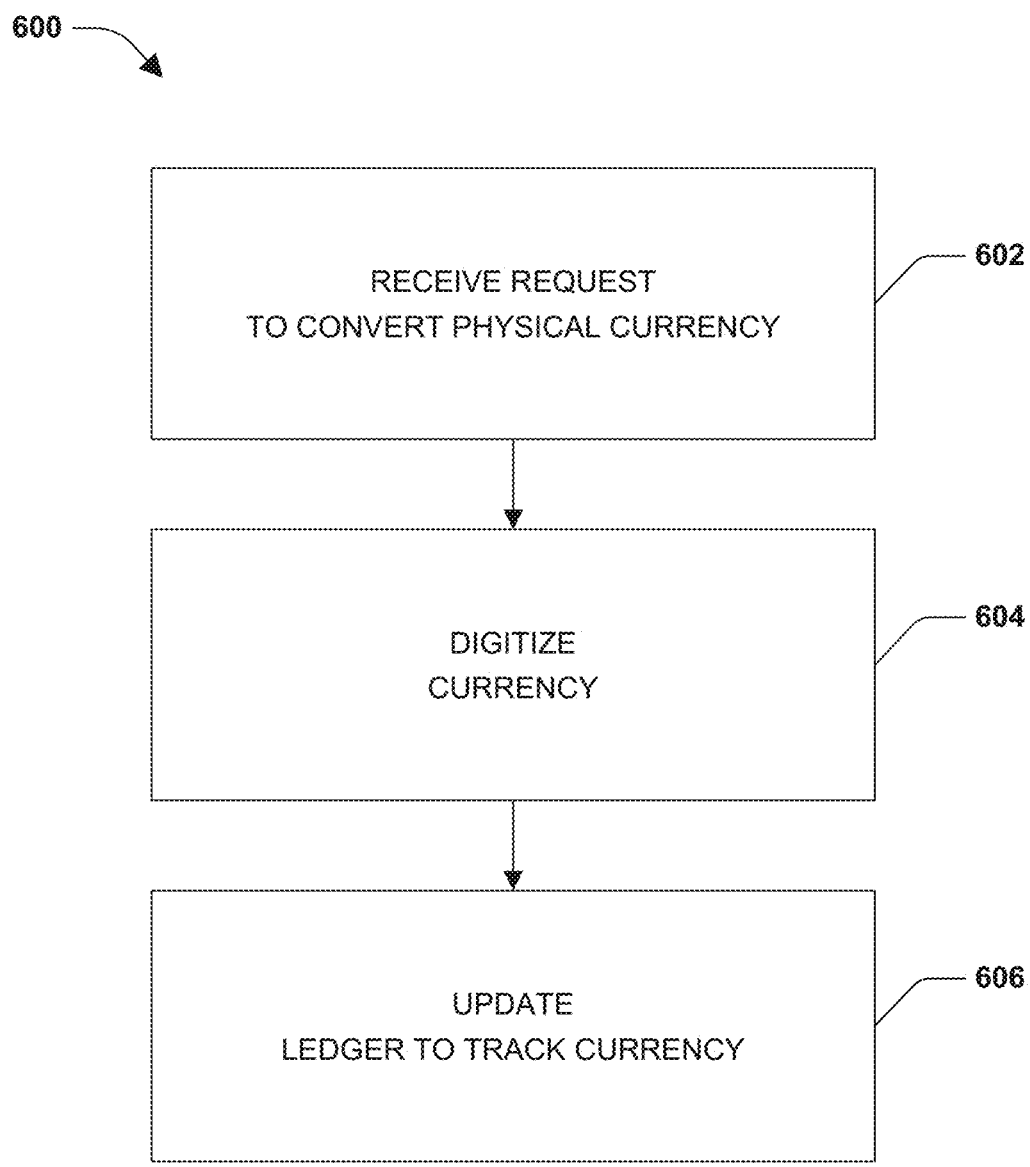
FIG. 6 illustrates an example methodology of cash grid system actions in accordance with aspects of the innovation.

FIG. 6 illustrates an example methodology 600 of conversion of physical to digital currency in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 602, a request to convert physical currency is received. As described supra, this request can be received, for example, via a request receiving component 102 of FIG. 1 at a kiosk, ATM, financial institution, etc. The request can be initiated in-person or via electronic means, for example, a smart-phone, mobile device, tablet, computer or the like.

At 604, the currency can be digitized or otherwise converted in an electronic object that represents (or takes the place of) the physical currency. Once converted, the appropriate ledger information is updated and recorded upon the cash grid. This simplistic example will be better understood upon a review of the discussion that follows.

Figure 7:
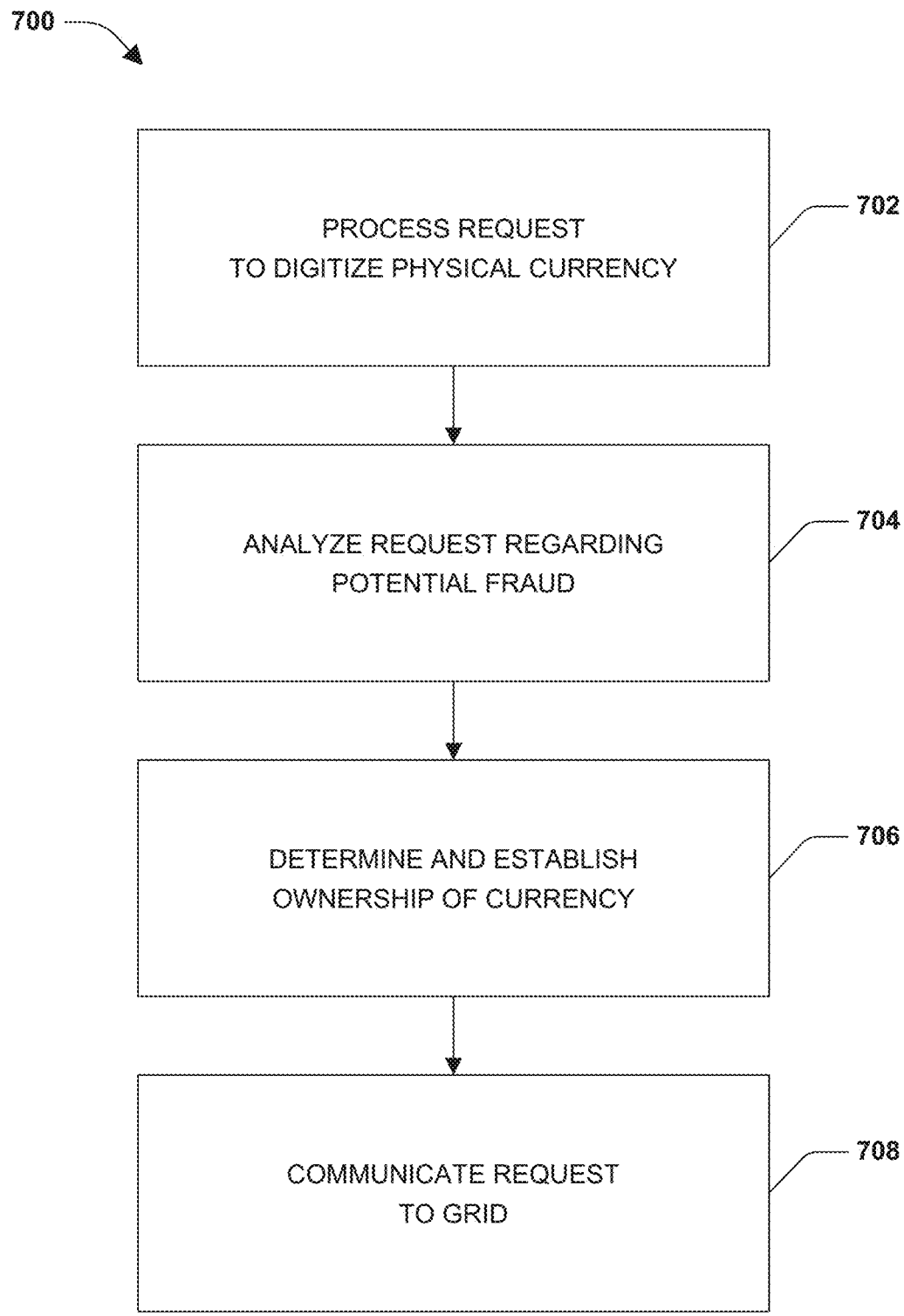
FIG. 7 illustrates an example methodology of processing a request in accordance with aspects of the innovation.

Illustrated in FIG. 7 is another example methodology 700 in accordance with aspects of the innovation. In this example, a request to process or digitize physical currency is received and processing commenced at 702. At 704, the request is analyzed for potential fraudulent activity. For example, the serial numbers of the physical currency can be captured and compared to information upon the cash grid to confirm that the physical currency had not been previously converted.

Similarly, at 706, ownership of the physical currency can be determined and established to ensure the requestor is the rightful owner of the currency. It will be understood that, as physical currency is logged (and tagged) this step will be an effective tool in mitigating fraud, laundering and theft. Thereafter, the information can be communicated to the cash grid.

Figure 8:
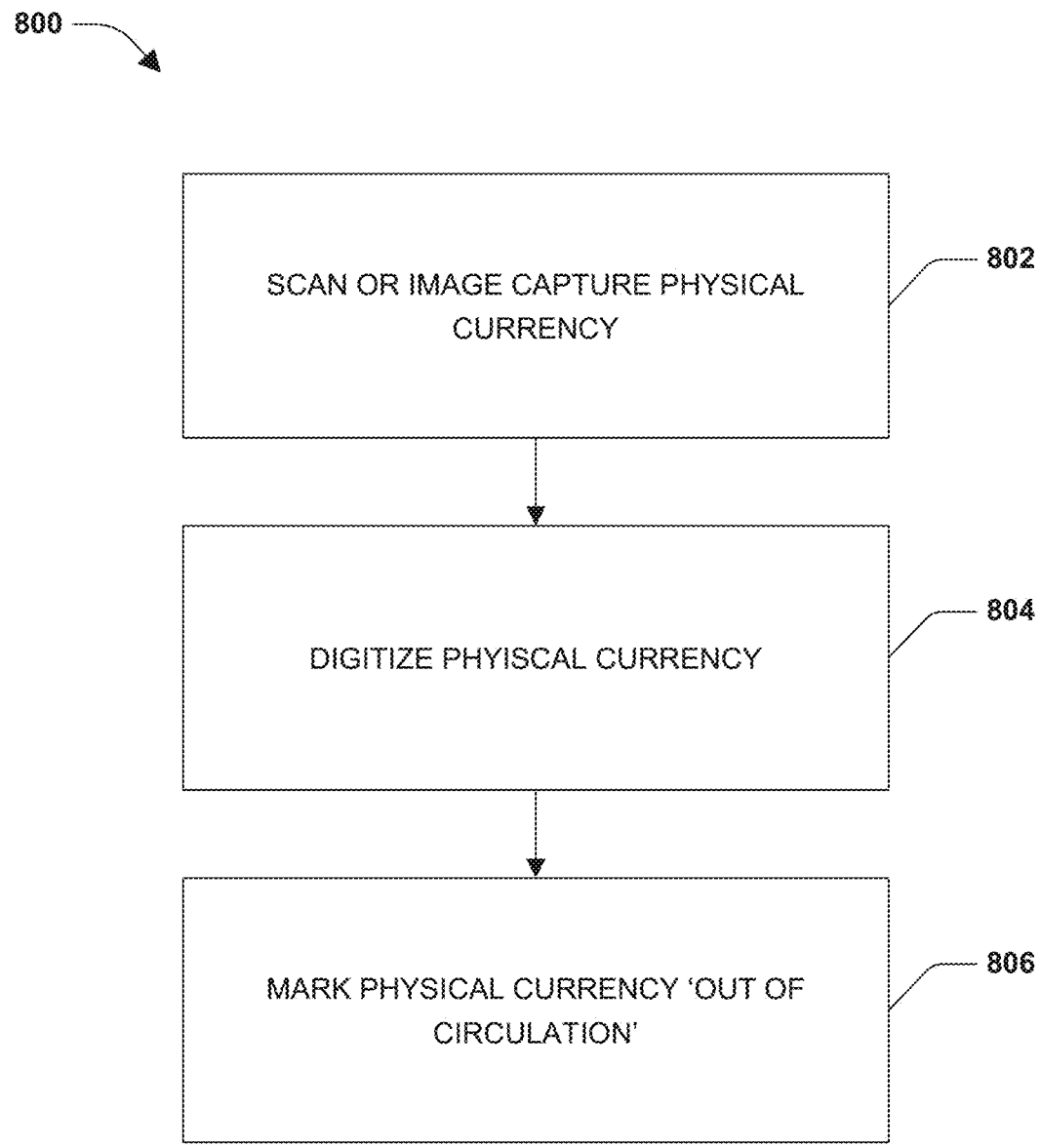
FIG. 8 illustrates an example of digitizing currency in accordance with aspects of the innovation.
Figure 9:
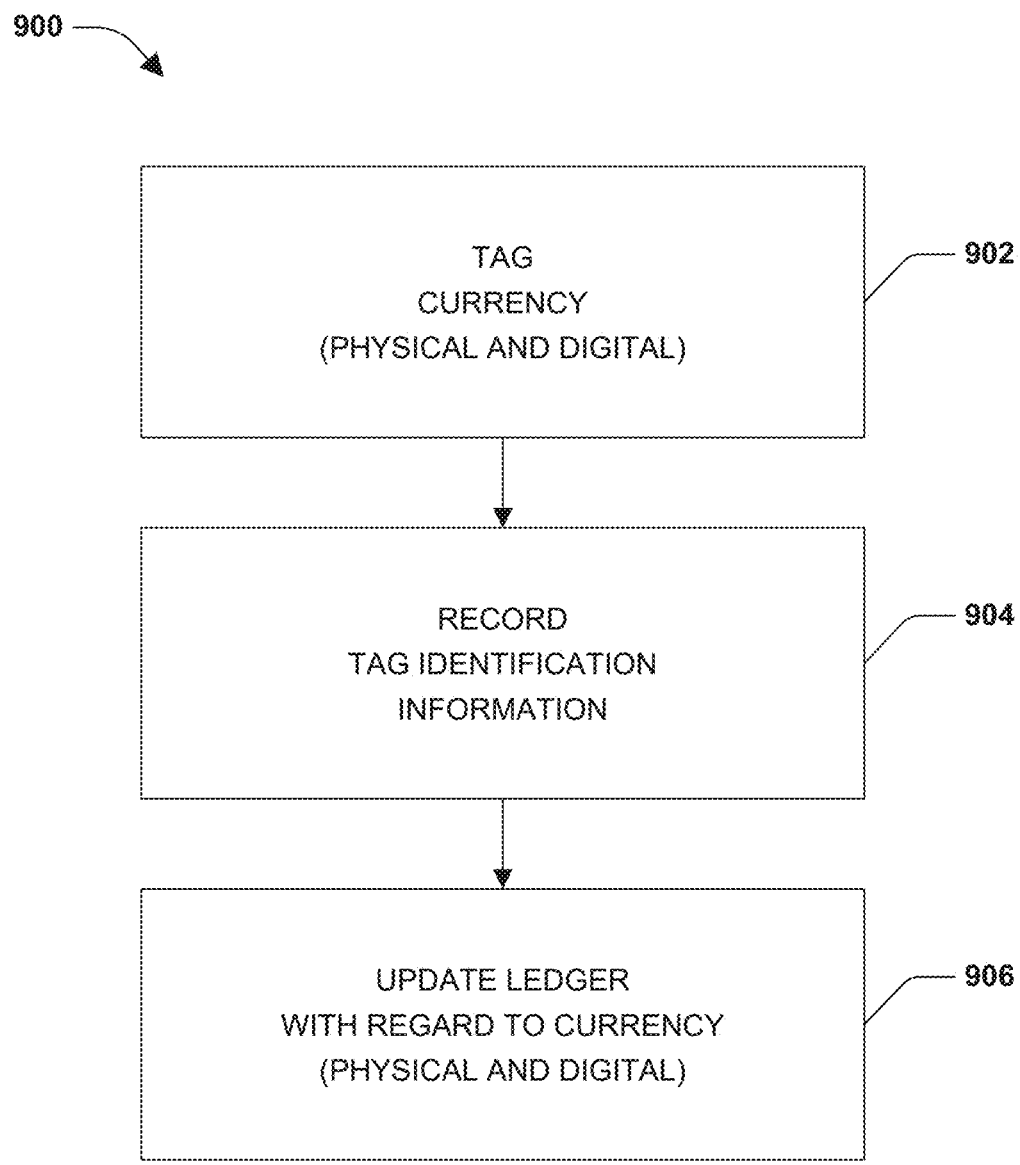
FIG. 9 illustrates an example methodology of ledgering transactions in accordance with aspects of the innovation.

FIG. 8 illustrates an example methodology 800 of digitizing currency in accordance with aspects of the innovation. Here, once ownership is established and the request is processed as described in accordance with FIG. 7, the physical cash can be scanned and analyzed at 802. Thus, the serial number, denomination as well as other identifying attributes can be captured and used in generation of the digitized electronic object generated at 804. The digitized currency generated at 804 corresponds to the physical currency and is linked at least by a unique identifier such as a serial number.

The now-converted physical currency is marked as being 'out-of-circulation' at 806. For instance, a unique, permanent, non-removable mark can be placed upon the paper currency notes. The mark can be most any identifying mark including, but not limited to, 'VOID,' 'INVALID,' 'OUT-OF-CIRCULATION,' etc. In other examples, the paper currency notes can be embossed, stamped or imprinted with a similar mark. Still further, the paper currency can be destroyed, cut, punched or physically altered in most any manner sufficient to effect a permanent identification of currency that had been converted to digital form objects.

A methodology 900 that illustrates an example act of updating a ledger to track the digital currency objects is shown. At 902, the currency is electronically tagged (e.g., with metadata or the like). Here, in the case of digital currency objects, metadata or other identifying data/tags/markers can be embedded into the object to as to sufficiently tag the currency to an owner, account, physical currency counterpart, etc. Similarly, an electronic tag can be generated for physical currency that remained in physical form, for example, where a customer desired to hold onto physical currency notes. In this scenario, the tags can assist with identification of the monies upon the cash grid.

The information can be recorded at 904 (e.g., in an appropriate data store) and updated upon a ledger at 906. It will be appreciated that the recordation and ledger generation can be analyzed, queried or otherwise reviewed by those having authority to do so. Examples follow that illustrate a number of ledger scenarios and the value of tracking digital (and physical) currency.

Following are a number of example use cases in accordance with embodiments of the innovation. These use cases are included to provide context and example to the innovation and are not intended to limit the innovation in any manner. Rather, alternative embodiments exist that are to be included within the scope of this specification and claims appended hereto.

In a first use case, recordation of currency ownership is addressed. When the customer withdraws cash, for instance, either at a branch or ATM, the ownership details are recorded in a ledger such as the example ledger shown in FIG. 10. In accordance with the innovation, this ledger is generated, e.g., via ATM, and forwarded to cash grid.

With reference to FIG. 10, a customer has withdrawn $250 from an ATM or local bank branch. This transaction can be recorded into a ledger as shown in FIG. 10. In particular, as shown, the example ledger includes a cash grid serial number in column one for tracking transactions related to a particular currency note (digital or physical). The bank or financial institution where the transaction occurred is identified in the second column. The next column identifies the requestor being, e.g., social security number of a customer or identification of a particular bank branch. Accordingly, the account number(s) affected are in the following column.

The date of the transaction and denomination are tracked as shown. As described herein, the innovation enables granular recordation and tracking of a particular note. Thus, the serial number of the note is likewise tracked. For effective tracking and ledgering, the bank transaction identification, description and type are logged. In this example, a 'D' denotes a debit while a 'C' denotes credit.

To effectively track a chronology of activity related to a note, the parent serial number as well as a designation if the record is the latest track is noted. Finally, an indicator that identifies physical or digital currency is included in the final column. While the ledger shown is specific in configuration and design, it is to be understood that most any layout, design, etc. can be used without departing from the spirit and/or scope of the innovation. Moreover, additional or fewer identifiers can be included to enhance a desired ledger performance and functionality.

Returning to the example, this ledger shows that cash grid serial numbers 330, 331 and 332 were debits from the financial institution's account as designated by the 'D' in the transaction type column. These same physical notes, as evidenced by the serial numbers, were transferred to the customer as a credit ('C'). Similarly, deposit transactions are also recorded in the ledger. In these instances, the ownership gets transferred from customer to bank.

Continuing with the same ledger layout/configuration, FIG. 11 corresponds to an example of digitizing the physical currency with cash deposit/payment. Here, the customer desires to digitize all inserted currency. In this example, consider an ATM deposit. Therefore, when a customer wants to deposit/pay cash, the currency notes will be inserted into device tray or otherwise fed into the designated area of the machine.

As an initial step, the device (i.e., ATM in this example) then analyzes the notes in order to recognize counterfeit notes and legitimate or valid notes. The device counts valid notes, scans them and identifies the serial number on each of those notes along with the denomination. This information is then passed to the cash grid along with the account number of the customer (requestor).

In this example, the device (ATM) then prints "INVALID" on each of the valid notes so as to effectively take them out of circulation. It will be appreciated that, as indicated supra, most any method of taking physical currency out of circulation are included within this innovation. By example and not limitation, marking, stamping, physically altering, etc. can be used to identify a physical note that has been taken out of circulation. If necessary, the device bundles all fake notes along with the marked notes and sends them to a central bank. In other examples, the device can automatically destroy any fake or out-of-circulation physical notes.

The central bank tracks the digitized currency and the physical currency. In other words, once all the physical currency is digitized for a given denomination, the central bank would issue a notification to the banks regarding the same. As needed, the central bank could print or issue digitized currency in relation to the deposited physical currency. The cash grid maintains the information as follows as illustrated in FIG. 11.

As illustrated, the cash grid maintains its own serial number for all digital currency. When a currency note gets converted to digital currency for the first time, the parent serial number will be 'null' and the digital currency is current by default. For example, upon receipt at the cash grid to search for a particular currency note serial number in its journal, it will only be necessary to query entries that are current, having a 'Y' in latest column.

Following with the example, assume that a customer wants to digitize only a portion of the inserted currency. In this case, a record is made into the ledger to record the transfer of ownership of the full amount to bank. The desired amount for withdrawal is then converted to digital currency. This sub-denomination of currency is obtained from the bank and it gets adjusted accordingly in the ledger.

For instance, assume the customer deposits $500 of physical currency and desires $300 to be converted to digital notes. In this scenario, the bank will initially record the $500 as ownership transfer to the bank. The bank will then digitize $300 and assign it to the customer. In operation, the $300 could be represented by any random notes that bank owns.

Should the customer want to digitize coins or combinations of coins and physical notes, the process would be the same as previously described. However, in this case, since coins do not have unique identity (e.g., serial numbers), they can be accumulated and rounded to a nearest unit. A new serial number can be generated and assigned to that unit and mapped to the customer. Thereafter, the coins can be sent back to mint for destruction.

Turning now to an example of payments or transfers using digital money, when a customer wants to pay cash at POS (point of sale) terminals, the customer may simply transfer the digital funds, e.g., by swiping his digital wallet/debit card as it is done today. Accordingly, the funds get deducted or debited from the customers' account. To reflect the transaction, the cash grid adjusts the account number with the merchant's account by randomly choosing the digital money that the customer already has in the account. An example ledger entry is shown in FIG. 12. Here, the example assumes that the customer paid $100 for this transaction. Following the transaction, the ledger can appear as shown in FIG. 12.

As illustrated, the cash grid selected digital currency with serial number 334 for this transaction. In order to effect mapping/tracking, the cash grid created another entry (serial number 1027) in the journal with transaction details and identified that entry as latest. Additionally, the ledger reflects the parent serial number as 334 for the new entry record and made cash grid serial number 334 entry as inactive. Therefore, should this currency note be used again, the latest note with cash grid serial number 1027 is used.

As explained in detail herein, the innovation enables the chronology or history of a currency note to be track and, if needed, recreated (e.g., for forensic accounting or like). When government agencies (or other authorized entities) want to track down history of a particular digital currency note, it can be accomplished via the ledger in the following manner. It is to be appreciated that the following sequence (or methodology) is distinguished from Bitcoin where the holder is anonymous.

In tracking, the entity can check the cash grid's journal for the given serial number where the Is Latest indicator as 'Y.' This designation indicates that the current account related to this record is actually holding the digital note. By looking at the parent of this note, a previous owner of the note can be identified. Similarly, one can traverse through the entire history of the note by using parent serial number as the indicator flag.

The innovation further enables identification of marked (e.g., 'out-of-circulation) physical notes that have already been digitized. If a customer attempts to use (or convert) a physical note that has already been digitized, the cash grid's journal can be queried such that, via journal tracking, those physical notes can be rejected. Similarly, in aspects, this journal query or request service could be utilized by customers to check if the physical notes they receive from others are already digitized.

Following is a discussion where a funds transfer results in insufficient digital money, for instance, when someone attempts to transfer the money from one account to another and the originating account does not have enough digital balance to complete the transaction. This situation can be handled by transferring the available digital money and remaining monies (currently held in physical form) from the customer's bank account. In this manner, at some point, all of the customer's physical money will be converted to digital currency. At that moment, banks can directly forward the transaction to the cash grid, and take the physical money out of circulation as appropriate. As described herein, the customer can refer to cash grid's journal for various services like transaction statements, aggregated balances, etc.

Oftentimes, a transfer of money will occur with sub-denominations that differ from those held on the grid. For instance, assume the customer wants to transfer money from one account to another account, but the denominations available in the cash grid's account do not directly align or support the desired transfer. In this case, the transaction can occur as follows. The system can identify the denominations that should be divided to perform the transaction. Multiple sub-entries are created in the journal which refers them back to the parent denomination. Thereafter, the transaction can be completed as desired. An example cash grid journal entry chronology is shown in FIGS. 13, 14 and 15.

Initially, FIG. 13 illustrates a state of the cash grid's journal for the customer. In this example, assume the customer wants to transfer $125 to another customer. The cash grid would divide the $50 to sub-denominations before performing actual transfer. Note that the innovation enables splitting the money into random (non-conventional) blocks of sub-units based on the requirement. It will be appreciated that this division can go up to the level of cent. In other words, in some scenarios such as online transactions, the cent level may be required though it may not happen in physical form.

FIG. 14 illustrates an intermediate state of the cash grid's journal for this example customer. As shown, two $25 entries are created and linked to parent serial number 336. As such, the parent is marked as no longer active (e.g., Is Latest is 'N'). Again, it is interesting to note that most any non-conventional denominations are possible in the digital currency model. In other words, although a $25 bill does not exist in the physical world, it is possible to generate these denominations in the digital world as they best fit the need in view of the desired transaction.

FIG. 15 illustrates the final example cash grid journal for the customer. As will be appreciated, the transactions 'To Sam' are identified as well as the digital assets transferred. It is important to note that, in this example, the sub-denominations share the serial number of their parent with an additional suffix, e.g., '-1' and '-2.' This information can be used to recreate and otherwise track currency as/if desired.

As described supra, another advantage of the innovation is that it provides an ability to mitigate, alleviate or eliminate money laundering. Since the digital money is tracked in cash grids' journal, money laundering can be alleviated or prevented to a great extent. It will be understood that, once all the physical cash gets converted to digital money, money laundering can potentially be prevented completely. For instance, a real estate transaction that generally involves huge money is a potential use case where funds' chronology can be tracked via the cash grid's journal thereby identifying potential fraudulent uses. Trade-based money laundering (e.g., freight) could be another use case where the journal chronology can be employed to identify criminal behavior.

Overall, the innovation can be an effective tool to identify and fix fraudulent transactions. As will be understood and appreciated, one of the problems that the banks face nowadays is fraudulent transactions. In accordance with the innovation's systems and methodologies, it is very easy (and cost efficient) to interrogate the history of such transactions in the ledger, identify the digital currency part of such transaction and then identify the current and lawful owner of the digital cash.

Identification of stolen digital money can be easily accomplished via the cash grid. With the complete digitization, it can be possible to prevent stealing the money from a wallet. For instance, even if someone tries to steal the digital money by using various hacking techniques, the cash grid's journal can help identify who has stolen the money. Similarly, the real- or near real-time query capability can enable a receiver to ensure that they are receiving legitimate 'in-circulation' funds from the rightful owner.

Moreover, in addition to real- or near real-time querying, the innovation can expedite most any funds transaction. Using conventional methods, transactions between C to C and C to B can take between 2 to 3 days (or more) due to considerations related to fraud, available funds, etc. The innovation's central cash grid makes it possible to perform transaction in milliseconds due to inherent capabilities of the cash grid and unique chronological journaling capabilities.

While a unique journaling model is illustrated and described supra, it is to be understood and appreciated that the innovation can employ most any chronology recordation without departing from the spirit and/or scope of the innovation. By way of example and not limitation, the cash grid system can employ blockchain in a distributed database environment. In this example, the system can maintains a real- or near real-time list of ordered blocks or records related to transactions. As will be understood, in this model, each block can be time-stamped and associated or otherwise linked to a previous block.

With reference again to FIG. 2, a blockchain model could specifically link ATMs, POSs, and Government Agencies directly to all or a subset of the financial institutions individually as well as to the cash grid directly. In this model, a side chain can be maintained at both the financial institution (e.g., for their specific customers) as well as upon the grid (e.g., for authorized entities as well as customers). Here, the government agencies can monitor the blockchain via the cash grid directly while the individual financial institutions can maintain their own records that mirror those of the grid. Additionally, in aspects, the cash grid can be managed by a bank replacing the conventional ACH (automated clearing house) which batch processes large volumes of debit and credit transactions.

Figure 16:
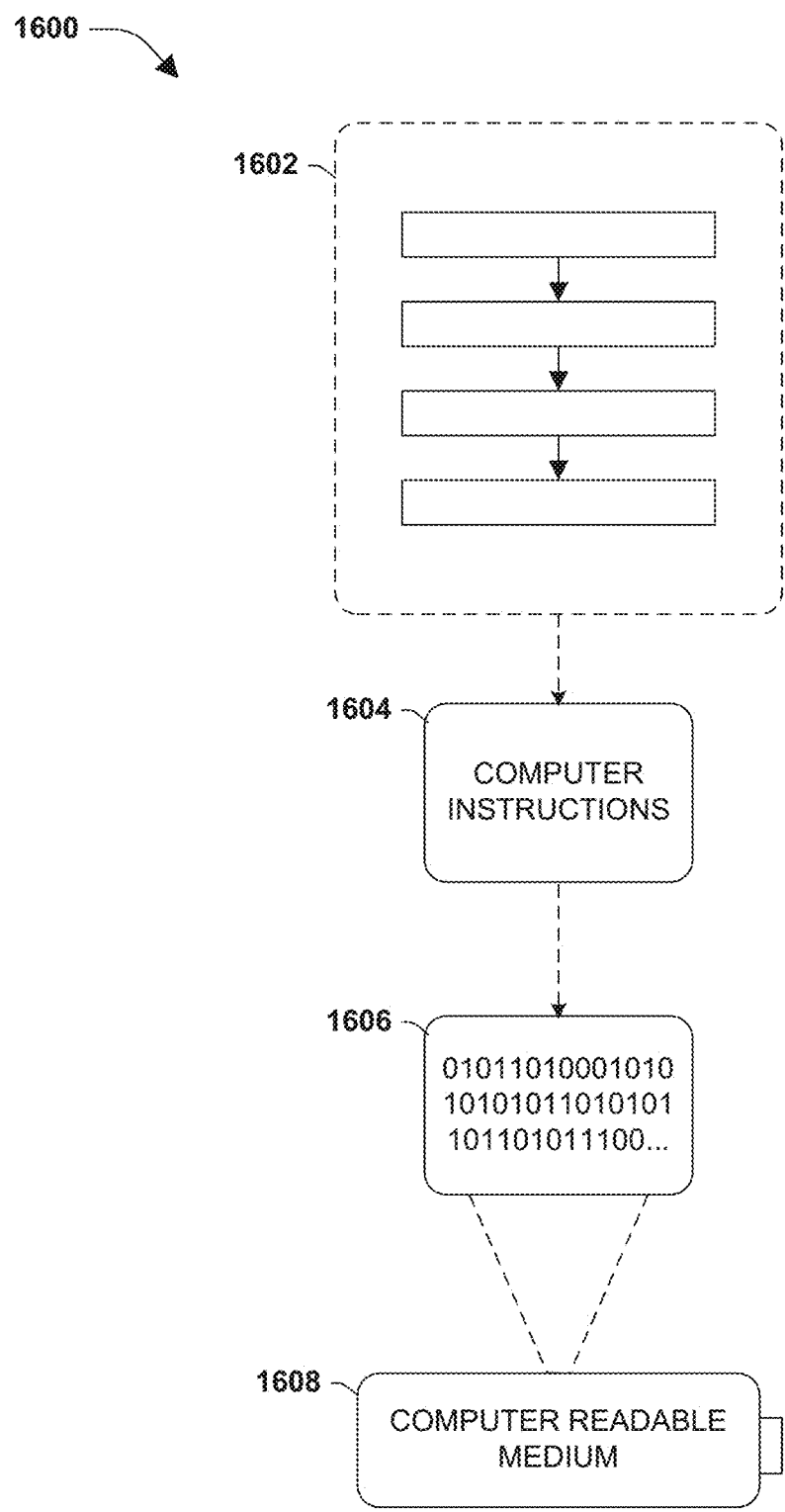
FIG. 16 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 16, wherein an implementation 1600 includes a computer-readable medium 1608, such as a CD-R, DVD-R, flash drive, a platter of a hard disk drive, etc., on which is encoded computer-readable data 1606. This computer-readable data 1606, such as binary data including a plurality of zero's and one's as shown in 1606, in turn includes a set of computer instructions 1604 configured to operate according to one or more of the principles set forth herein. In one such embodiment 1600, the processor-executable computer instructions 1604 may be configured to perform a method 1602, such as the methods described supra. In another embodiment, the processor-executable instructions 1604 may be configured to implement a system, such as the systems described supra. Many such computer-readable media may be devised by those of ordinary skill in the art that are configured to operate in accordance with the techniques presented herein.

As used in this application, the terms "component", "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 17:
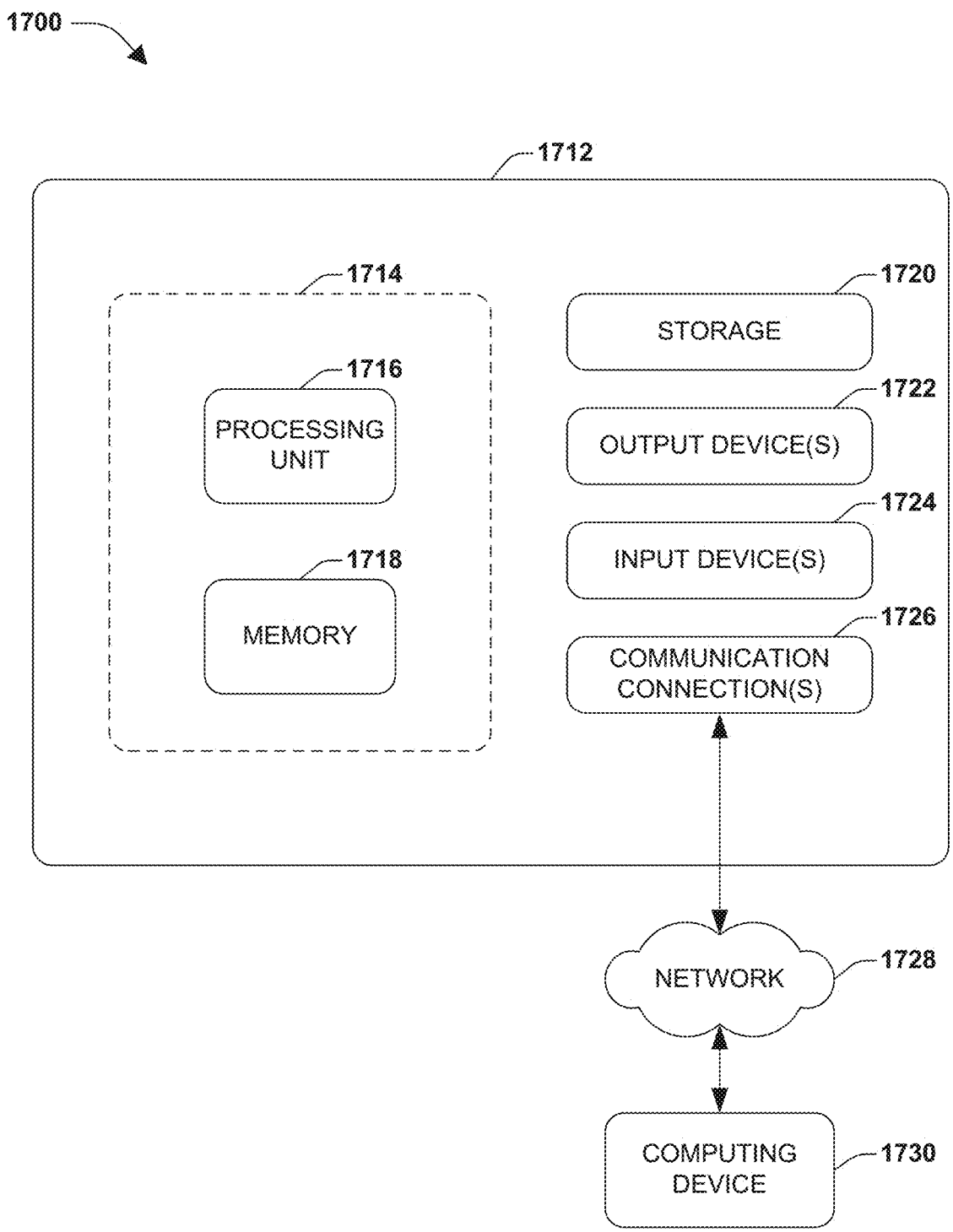
FIG. 17 is an illustration of an example computing environment where one or more of the provisions set forth herein are implemented, according to one or more embodiments.

FIG. 17 and the following discussion provide a description of a suitable computing environment to implement embodiments of one or more of the provisions set forth herein. The operating environment of FIG. 17 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 17 illustrates a system 1700 including a computing device 1712 configured to implement one or more embodiments provided herein. In one configuration, computing device 1712 includes at least one processing unit 1716 and memory 1718. Depending on the exact configuration and type of computing device, memory 1718 may be volatile, such as RAM, non-volatile, such as ROM, flash memory, etc., or a combination of the two. This configuration is illustrated in FIG. 17 by dashed line 1714.

In other embodiments, device 1712 includes additional features or functionality. For example, device 1712 may include additional storage such as removable storage or non-removable storage, including, but not limited to, magnetic storage, optical storage, etc. Such additional storage is illustrated in FIG. 17 by storage 1720. In one or more embodiments, computer readable instructions to implement one or more embodiments provided herein are in storage 1720. Storage 1720 may store other computer readable instructions to implement an operating system, an application program, etc. Computer readable instructions may be loaded in memory 1718 for execution by processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1712. Any such computer storage media is part of device 1712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1712 includes input device(s) 1724 such as keyboard, mouse, pen, voice input device, touch input device, infrared cameras, video input devices, or any other input device. Output device(s) 1722 such as one or more displays, speakers, printers, or any other output device may be included with device 1712. Input device(s) 1724 and output device(s) 1722 may be connected to device 1712 via a wired connection, wireless connection, or any combination thereof. In one or more embodiments, an input device or an output device from another computing device may be used as input device(s) 1724 or output device(s) 1722 for computing device 1712. Device 1712 may include communication connection(s) 1726 to facilitate communications with one or more other devices.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system that facilitates a cash grid, comprising:
- a request receiving component configured to process a request to digitize physical currency, wherein the digitizing includes converting the physical currency into a digital object;
- a fraud detection component that validates authenticity of the physical currency prior to generation of the digital object;
- an ownership determination component that validates ownership of the physical currency prior to generation of the digital object;
- a conversion component configured to generate a digital object that corresponds to at least a portion of the physical currency such that the digital object replaces the physical currency in circulation;
- a physical currency marking component that physically alters the physical currency in a manner that destroys the physical currency such that the digital object replaces the physical currency in circulation;
- a tracking component that associates the digital object to the at least a portion of the physical currency; and
- a recordation component that facilitates generation of a blockchain ledger entry that identifies a chronology of a plurality of transactions associated with the physical currency, wherein the blockchain ledger entry includes a cash grid serial number, a transaction type indicator, an identification of a current owner of either the physical currency or digital object, and a state of the digital object, wherein the state of the digital object identifies the physical currency that corresponds to the digital object, wherein the physical currency is physically destroyed to be 'out-of-circulation.

2. The system of claim 1, further comprising:
- a scanning component or an image capture component that identifies unique information from the physical currency for inclusion into the digital object.

3. The system of claim 2, wherein the unique information includes a denomination and serial number that identifies the physical currency.

4. The system of claim 1, further comprising:
- a physical currency tagging component or a digital currency tagging component that associates the physical currency or the digital object to the cash grid.

5. The system of claim 1, comprising:
- wherein the conversion component:
  - digitizes only a portion of the physical currency according to the request;
  - destroys only the portion of the physical currency to be digitized; and
  - deposits the remaining physical currency into a conventional account associated with the customer.

6. A method for tracking currency via a centralized grid, comprising:
- a processor coupled to a memory having instructions thereon for execution of the following acts:
  - receiving a request to convert physical currency to a digital object, wherein the digitizing includes converting the physical currency into a digital object;
  - validating authenticity of the physical currency prior to generation of the digital object;
  - validating ownership of the physical currency prior to generation of the digital object;

digitizing and associating the physical currency to the digital object such that the digital object replaces the physical currency in circulation;

physically altering the physical currency in a manner that destroys the physical currency such that the digital object replaces the physical currency in circulation; and updating a blockchain ledger that reflects an ownership of the digital object, wherein the blockchain ledger identifies a chronology of a plurality of transactions associated with the physical currency, wherein the blockchain ledger includes a cash grid serial number, a transaction type indicator, an identification of a current owner of either the physical currency or digital object, and a state of the digital object, wherein the state of the digital object identifies the physical currency that corresponds to the digital object, wherein the physical currency is physically destroyed to be 'out-of-circulation.

7. The method of claim 6, wherein the device is embodied within an ATM.

8. The method of claim 6, further comprising:
analyzing the physical currency to make a determination regarding fraudulent activity.

9. The method of claim 6, wherein the blockchain ledger logs a chronology of activity related to the physical currency or digitized currency.

10. The method of claim 6, comprising:
digitizing only a portion of the physical currency according to the request;
destroying only the portion of the physical currency to be digitized; and
depositing the remaining physical currency into a conventional account associated with the customer.

11. A computer-readable storage medium comprising computer-executable instructions, which when executed via a processing unit on a computer performs acts, comprising:

receiving a request to transfer digital currency on a cash grid, wherein the digital currency replaced a physical currency that was previously in circulation and destroyed after creation of the digital currency, wherein ownership and authenticity of the physical currency were validated prior to generation of the digital currency;

analyzing a plurality of blockchain ledger entries associated with the digital currency, wherein the analysis establishes a state of the digital currency, wherein the state of the digital currency establishes a latest transaction identification, transaction description and parent serial number related to the digital currency wherein the state of the digital currency identifies a current owner of the digital currency wherein the state of the digital currency identifies the physical currency that corresponds to the digital currency, wherein the physical currency is physically destroyed to be 'out-of-circulation; and transferring and logging ownership of at least a portion of the digital currency.

12. The computer-readable storage medium of claim 11, comprising:
converting the digital currency into a set of two or more other digital currencies having a total denomination equivalent to an original denomination of the digital currency; and
transferring a subset of the set of two or more digital currencies equivalent to a requested denomination provided in the transfer request.

13. The computer-readable storage medium of claim 12, comprising:
generating a new blockchain ledger entry for each digital currency in the set of two or more other digital currencies.

* * * * *